V. L. BUCHMAN.
RESILIENT TIRE.
APPLICATION FILED JUNE 20, 1917. RENEWED OCT. 22, 1919.

1,342,158.

Patented June 1, 1920.
2 SHEETS—SHEET 1.

Inventor
V. L. Buchman
By
Attorneys.

V. L. BUCHMAN.
RESILIENT TIRE.
APPLICATION FILED JUNE 20, 1917. RENEWED OCT. 22, 1919.

1,342,158.

Patented June 1, 1920.

Inventor
V. L. Buchman

UNITED STATES PATENT OFFICE.

VERNON L. BUCHMAN, OF MILLERS, MARYLAND.

RESILIENT TIRE.

1,342,158.  Specification of Letters Patent.  Patented June 1, 1920.

Application filed June 20, 1917, Serial No. 175,944. Renewed October 22, 1919. Serial No. 332,577.

*To all whom it may concern:*

Be it known that I, VERNON L. BUCHMAN, a citizen of the United States, residing at Millers, in the county of Carroll and State of Maryland, have invented certain new and useful Improvements in Resilient Tires, of which the following is a specification.

My invention relates to new and useful improvements in resilient tires and more particularly to tires of the so called airless type and further relates to a novel form of rim for use with the tire.

In this connection one of the primary objects of my invention consists in the provision of a substantially trough shaped rim, the side walls of which will to a great extent replace the usual fabric and rubber side walls of the casing and in the provision of a casing which is practically in the form of a tread only, its beads having locking engagement with the edges of the side walls of the rim.

Another object which I have in view is the provision of a core entirely separate and distinct from the tread and comprising a tread or thrust portion engaging against the inner face of the casing and inwardly diverging annular side wall portions the inner edges of which engage against the body of the rim.

The difficulty commonly experienced in the employment of airless tires is deterioration through over heating due to friction, and another object which I have in view is the provision of means for creating an air circulation within the rim and about the core to prevent overheating.

Other objects such as a novel means for securing the casing beads to the rim, means for holding the core and casing against independent lateral movement, and the like, will be apparent from the more complete description, the illustration of my invention in the drawings and a perusal of the claims which form a part of this application.

In the drawings:

Fig. 2 is a radial sectional view;

Fig. 3 is a fragmentary elevation of the turnbuckle mechanism employed in securing the casing to the rim;

Corresponding and like parts are referred to in the following description and indicated in all the views of the drawings by the same reference characters.

Figure 1:
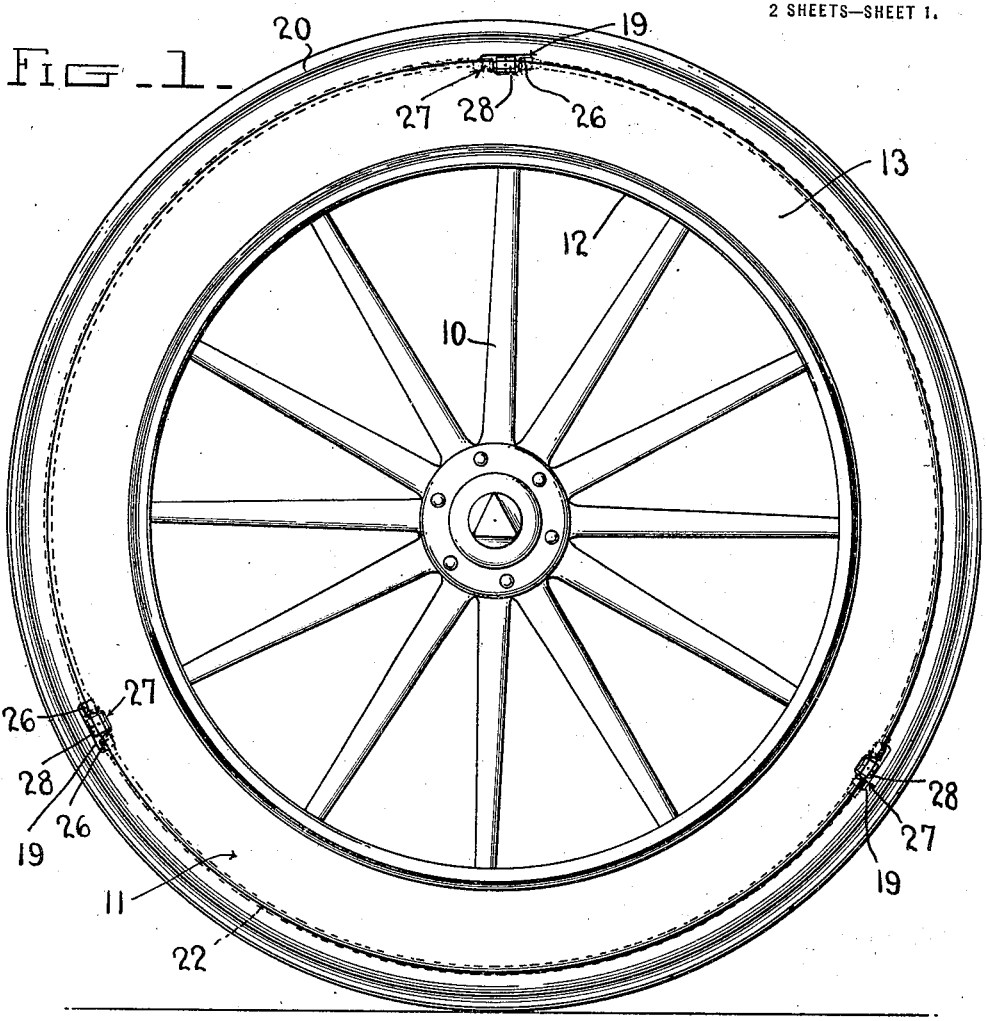
Figure 1 is a side elevation of a rim and tire applied to a wheel of conventional design.

In order to insure a clear and accurate understanding of my invention I have illustrated it as applied to a conventional form of motor vehicle wheel 10. My improved rim, indicated as a whole by the numeral 11 may be formed of any suitable metal and constructed for permanent attachment to the felly 12 of the wheel or it may be of the demountable type so that it may be readily removed from the wheel. This rim is provided with substantially radially extending outwardly curved side walls 13 and its intermediate portion is formed throughout its circumference with a continuous radially out-struck stop bead or shoulder 14, centrally located. The rim therefore has two annular body or base portions 15 engaging the felly. As best shown in Fig. 2 of the drawings the free edges of the side wall portions 13 of the rim are thickened and grooved to provide annular bead grooves or seats 16 defined by inner bead retaining flanges 17 and outer bead retaining flanges 18, the latter being of less height than the former and being cut-away at spaced intervals as shown at 19, for a reason which will be later apparent.

The tire casing indicated as a whole by the numeral 20 may be built up of fabric and rubber in the usual or any preferred manner. As a rule this casing will include a number of inner fabric plies 21 against the sides of which resilient bead cords or wires 22, one to each bead are applied, the edges of the fabric being brought outwardly about the beads so that they will lie practically flush with the edges of the outer flanges 18 of the rim. A number of outer plies of the fabric 23 are then applied and brought down about the bead wire with their edges abutting against the edges of the first plies. The rubber tread proper 24 is then applied in the usual manner and may be plain surfaced or provided with non-skid elements as preferred. Preferably the inner face of the casing 20 centrally of its width is formed with an inwardly projecting annular locking bead or shoulder 25 which may be provided by positioning a cord between the two inner plies of fabric when making the casing.

Figure 4:
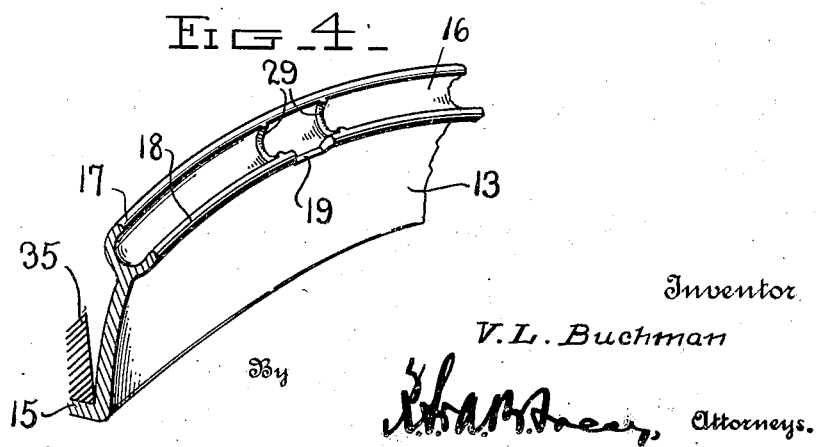
Fig. 4 is a fragmentary perspective view showing certain details of rim structure.

Each bead wire or cable is formed in one, two, three or more sections, dependent upon the size of the tire and the depth of the bead grooves of the rim upon which it is employed and the ends of the sections are anchored in sleeves 26 of turnbuckle mechanisms 27. These sleeves 26 are internally threaded to receive the threaded terminals of a coupling nut 28, the intermediate portion of which may have flattened wrench receiving faces or may be formed with pin receiving sockets so that it may be conveniently turned. As shown in Fig. 1 and also in Fig. 4 the outer flanges 18 of the rim are cut-away at proper intervals to expose these turn-buckle mechanisms and the grooves of the side walls of the rim at such points are provided with transverse shoulders 29 which seat in annular grooves 30 formed in the nuts of the turn-buckles so as to hold the turn-buckles against circumferential movement about the rim. Obviously with the turn-buckles loosened the tire casing may be readily applied to the rim and by then tightening the turn-buckles, the casing may be firmly anchored against any possibility of displacement.

A resilient core, indicated as a whole by the numeral 31 is employed in connection with the above described rim and casing. This core includes an annular body or thrust portion 32 of relatively soft, spongy rubber, compressible under substantially forty-five pounds pressure. The outer face of this body portion is shaped to conform to the inner face of the casing, although it is generally of less width than the space between the inner flanges 17 of the rim and is provided circumferentially with a groove or channel 33 to seat the shoulder 25 of the casing. The inner face of the thrust portion 32, adjacent its sides inclines inwardly and downwardly somewhat and at either side of the center is formed with inwardly projecting abutments or shoulders 34. Annular side wall portions 35 make up the remainder of the core and seat at their inner edges against the portions 15 of the rim and at their outer edges against the inclined portions of the inner face of the core section 32 and against the outer faces of the abutments 34 thereof. As a result the side wall portions 35 of the core diverge inwardly. The outer half or three-fourths of the side wall portions 35 are formed of a rubber having somewhat more density and less resiliency than that forming the portion 32 of the core, as indicated by the cross-hatching, this rubber possibly being compressible under pressure of approximately sixty-pounds, while the inner rim portions of the side walls are formed of still more dense and less elastic rubber capable of being compressed at approximately seventy-pounds pressure.

As best shown in Fig. 2 of the drawings the inner edges of the side walls of the core fit snugly between the side walls of the rim and the sides of the instruck stop shoulder 14 or the inner face of the intermediate portion of the core is spaced from the shoulder 14. The inward diversion of the side wall portions of the core, together with the gradually increasing stiffness of such walls from their outer to their inner edges tend to prevent any undue lateral flexing or rolling of the core during the use of the tire and the engagement of the sides of the thrust section 32 of the core and of the sides of the side walls 31 of the core against the side walls of the rim or the sides of the rim shoulder 14 will effectively check and stop any undue movement of this nature.

At suitable intervals the intermediate portion of the shoulder 14 is formed with air vent nipples 36 having valve seats 37 for ball check valves 38 the stems 39 of which terminate in heads 40 serving as retaining means for springs 41 which normally hold the check valves to their seats. These springs are so light, however, that when a wheel equipped with my rim and tire is revolving at normal rate the valves will be thrown open by centrifugal force so that the suction created within the rim by successive distortions of portions of the tire and core will draw air through the openings 36 and create a free circulation of air within the rim which will prevent overheating of the core. This is an important feature as the life of cores is materially increased by this ventilation.

Inasmuch as the core is preferably free of any attachment to the casing it will be apparent that as one casing becomes worn it may be readily removed and a new one applied which is a great saving as a properly constructed core will out-wear a relatively large number of casings no matter how carefully and strongly the casings may be made.

At this point it should be noted that the side walls of the rim not only serve to protect the tire and core against injury but also serve to replace the side wall portions of the ordinary casing such as are now employed with pneumatic tubes and with resilient cores of various types. The material, both fabric and rubber needed to construct my improved casing is decreased by more than half as a result of this. Furthermore as a result of the shaping of the casing, there being relatively little transverse curvature, and on account of the fact that it is not subjected to any internal air pressure it is possible to use the casing until it has worn down to or through the innermost fabric ply. Under these conditions the only rubber remaining as waste when the casing is worn out is the slight amount about the beads of the casing. As a consequence I do away with the greater portion of the waste of rubber or the alternate expense of reclaiming such rubber such as is now experienced when tire casings become too worn for further use.

Obviously numerous changes in the shape and proportions of the rim, core and casing, as well as in the material of which they are made may be resorted to. For instance a very efficient tire for use upon lighter trucks as a substitute for the solid rubber tires now employed may be had. This may be accomplished by somewhat stiffening the side wall portions of the core and by proportioning the parts to bring the thrust portion of the core nearer the stop shoulder 14 of the rim. Under suitable proportioning the tire may be so made that when the truck is normally loaded the thrust portion of the core will engage against the shoulder 14 to give a solid tire effect, while when the load is partially or wholly removed from the truck the resilient support of the truck by the tires will be obtained. Because of these possibilities I reserve the right to make any changes which fall within the scope of the claims. For instance the degree of resiliency of the various portions of the core may be altered at will. Furthermore the side wall portions and thrust member may be integrally formed or may be separately formed and free of connection with each other or separately formed and secured by cement, vulcanizing or other suitable means.

Having thus described the invention, what is claimed as new is:

1. In a rim and tire construction, a rim having side wall portions providing an annular chamber, a casing having its side edges lockingly engaging the edges of the side walls of the rim, and a resilient core disposed between the rim and casing, the core including a thrust portion engaging the inner face of the casing and inwardly diverging annular portions engaging at their inner edges against the face of the rim at the juncture of such face and the side walls of the rim.

2. In a rim and tire construction, a rim having side wall portions providing an annular chamber, a casing having its side edges lockingly engaging the edges of the side walls of the rim, and a resilient core disposed between the rim and casing, the core including a thrust portion engaging the inner face of the casing and inwardly diverging annular portions engaging at their inner edges against the face of the rim at the juncture of such face and the side walls of the rim, the thrust portion being of relatively great resiliency, the outer parts of the side portions of less resiliency and the inner parts of the side portions of still less resiliency.

3. In a rim and tire construction, a rim including a base portion and radially extending side wall portions, a casing having beads lockingly engaged by the edges of the side walls of the rim, a core disposed within the casing and including an intermediate portion engaging the casing and diverging side portions engaging the rim at their inner edges, and means for supplying air to the space between the rim and side portions of the core, said means operating only when the rim is revolving at a predetermined speed.

4. In a rim and tire construction, a rim, a casing engaging the rim, a core disposed within the casing and having diverging side portions engaging the rim at their inner edges, and means for supplying air to the space between the rim and side portions of the core, said means including centrifugally operated check valves.

5. In a rim and tire construction, a rim having side walls, the edges of which are formed with circumferential grooves providing inner and outer bead retaining flanges, a tire casing having beads including sectional resilient clamping elements, turn-buckle connections between adjacent ends of the clamping element sections whereby the beads may be drawn into the grooves or released therefrom, and means preventing circumferential movement of the clamping elements.

6. In a rim and tire construction, a rim having side walls, the edges of which are formed with circumferential grooves providing inner and outer bead retaining flanges, a tire casing having beads including sectional resilient clamping elements, and turn buckle connections between adjacent ends of the clamping element sections whereby the beads may be drawn into the grooves or released therefrom, each turn-buckle mechanism including a coupling nut having circumferential grooves and the side walls of the rim being formed at suitable intervals with shoulders seating in the grooves to prevent circumferential movement.

7. In a rim and tire construction, a rim, a casing, a core in the casing, and centrifugally operating check valves for permitting passage of air through ports formed in the rim.

8. A rim and tire construction including a rim having side walls and an intermediate outstruck portion, a casing secured at its edges to the edges of the side walls, and a resilient core substantially U-shaped in cross section disposed between the casing and rim with its intermediate portion engaging the casing and its edge portions engaging the rim between the side walls and outstruck intermediate portion thereof.

9. A rim and tire construction including a rim having side walls and an intermediate outstruck portion, a casing secured at its edges to the edges of the side walls, and a resilient core substantially U-shaped in cross section disposed between the casing and rim with its intermediate portion engaging the casing and its edge portions engaging the rim between the side walls and outstruck intermediate portion thereof, the intermediate portion of the core being of relatively great resiliency, the adjacent portions of less resiliency and the edge portions of still less resiliency.

In testimony whereof I affix my signature.

VERNON L. BUCHMAN. [L. S.]